(12) United States Patent
Huang et al.

(10) Patent No.: US 7,706,676 B2
(45) Date of Patent: Apr. 27, 2010

(54) AUTOMATIC EXPOSURE CONTROL METHOD

(75) Inventors: Ssu-Hua Huang, Dacun Township (TW); Chen-Yuan Chong, Yongkang (TW)

(73) Assignee: Altek Corporation, Hsinchu (TW)

( * ) Notice: Subject to any disclaimer, the term of this patent is extended or adjusted under 35 U.S.C. 154(b) by 240 days.

(21) Appl. No.: 12/100,431

(22) Filed: Apr. 10, 2008

(65) Prior Publication Data

US 2009/0169194 A1      Jul. 2, 2009

(30) Foreign Application Priority Data

Dec. 31, 2007   (TW)   ............................... 96151606 A

(51) Int. Cl.
G03B 7/00    (2006.01)
G03B 9/70    (2006.01)
G03B 7/08    (2006.01)

(52) U.S. Cl. ................. 396/213; 396/166; 396/234; 348/362

(58) Field of Classification Search .................. 396/61, 396/63, 65, 165, 166, 213, 233, 234; 348/362–366, 348/370, 371
See application file for complete search history.

(56) References Cited

U.S. PATENT DOCUMENTS 6,859,618 B1    2/2005   Yip
6,931,208 B2 *  8/2005   Nakata et al. ............... 396/123

\* cited by examiner

*Primary Examiner*—W. B. Perkey
*Assistant Examiner*—Minh Q Phan
(74) *Attorney, Agent, or Firm*—Stevens & Showalter LLP

(57) ABSTRACT

An automatic exposure control method is used to control a shooting exposure parameter for shooting an image by a shooting end. At least one middle brightness value is acquired between a brightness value of a background region and an overall brightness value, and then a relation between working distances of a flash light and a practical distance of an object is determined sequentially from the brightness value of the background region to extend towards the overall brightness value, in which the working distances of the flash light are respectively corresponding to the brightness value of the background region, the middle brightness values, and the overall brightness value, so as to obtain a shooting exposure parameter and to selectively activate the flash light, thereby adjusting the overall brightness of the image to be shot, so as to obtain an image with a proper overall brightness.

10 Claims, 3 Drawing Sheets

| 100 | 100 | 100 | 100 | 100 |
|---|---|---|---|---|
| 100 | 100 | 100 | 100 | 100 |
| 100 | 10 | 10 | 10 | 100 |
| 100 | 10 | 10 | 10 | 100 |
| 100 | 10 | 10 | 10 | 100 |

FIG.2A

| 10 | 10 | 10 | 10 | 10 |
|---|---|---|---|---|
| 10 | 10 | 10 | 10 | 10 |
| 10 | 20 | 20 | 20 | 10 |
| 10 | 20 | 20 | 20 | 10 |
| 10 | 20 | 20 | 20 | 10 |

FIG.2B

AUTOMATIC EXPOSURE CONTROL METHOD

CROSS-REFERENCE TO RELATED APPLICATIONS

This non-provisional application claims priority under 35 U.S.C. §119(a) on Patent Application No(s). 096151606 filed in Taiwan, R.O.C. on Dec. 31, 2007, the entire contents of which are hereby incorporated by reference.

BACKGROUND OF THE INVENTION

1. Field of the Invention

The present invention relates to a photographing technique, and more particularly to an automatic exposure control method.

2. Related Art

Currently, an overall brightness of an image when the image is shot is determined by exposure parameters such as an exposure speed level, an aperture value, an exposure time, and an exposure parameter corresponds to a brightness value. When an object is shot under backlight, the obtained image has a brighter part and a darker part. When a brightness of a background region is higher, a brightness of an object region is made to be relatively lower, that is, the brightness contrast between the background region and the object region is relatively large. Because of the high brightness contrast between the object region and the background region, when the brightness value is adjusted to make the object region become brighter, but the originally brighter background region becomes even brighter, the background region is over-exposed. The reason lies in that the adjustment of the brightness value not only affects the brightness of the background region, but also affects the brightness of the object region, so when the brightness value is adjusted to make the background region become brighter, the object region also becomes brighter; and when the background region is adjusted to become darker, the object region also becomes darker.

In U.S. Pat. No. 6,859,618, under a situation of without adjusting the brightness value, the object region is merely compensated by controlling the flash light. However, due to being restricted by the working scope of the flash light, the flash light may not reach the object region, such that the brightness is insufficient. If the exposure parameter can be controlled by adjusting the brightness value and the flash light, the expected effect of compensating the brightness of the object by the flash light may further achieved.

SUMMARY OF THE INVENTION

In order to solve the problems of the prior art, the present invention is directed to an automatic exposure control method, which is suitable for solving the problem of the prior art that an image with a proper overall brightness cannot be obtained.

In the automatic exposure control method of the present invention, the compensation of the flash light may be controlled by adjusting the brightness value, so as to obtain a more proper overall brightness, thereby preferably adjusting the brightness of the background and the object.

According to an embodiment of the present invention, the present invention provides an automatic exposure control method, which is used to control a shooting exposure parameter for shooting an image by a shooting end. The image is formed by an object region and a background region. The method includes the following steps: providing information about the object region and the background region of the image; acquiring a brightness value of the object region, a brightness value of the background region, and an overall brightness value obtained by combining the brightness value of the object region with that of the background region; determining whether the object region has a backlight phenomenon or not according to the brightness value of the object region and that of the background region; measuring a practical distance from the object region to the shooting end; acquiring at least one middle brightness value sequentially by taking the brightness value of the background region as an initial value to extend towards the overall brightness value; acquiring a corresponding exposure parameter from the middle brightness value; calculating a working distance of a flash light according to the exposure parameter; determining whether the working distance of the flash light is larger than the practical distance or not; and finally, taking the middle brightness value satisfying the determining step that the working distance of the flash light is larger than the practical distance as an adjusting brightness value and acquiring a corresponding exposure parameter according to the adjusting brightness value to serve as the shooting exposure parameter, and activating the flash light.

To sum up, through the technical means of the present invention, it is determined whether the backlight phenomenon exists or not according to the adjusted brightness value, such that under a precondition that the flash is forced to be compensated within the working distance of the flash light, a more proper overall brightness is obtained, and thus preferably adjusting the brightness between the background region and the object region.

BRIEF DESCRIPTION OF THE DRAWINGS

The present invention will become more fully understood from the detailed description given herein below for illustration only, which thus is not limitative of the present invention, and wherein:

FIGS. 2A and 2B are schematic views of brightness information according to an embodiment of the present invention.

DETAILED DESCRIPTION OF THE INVENTION

Figure 1:
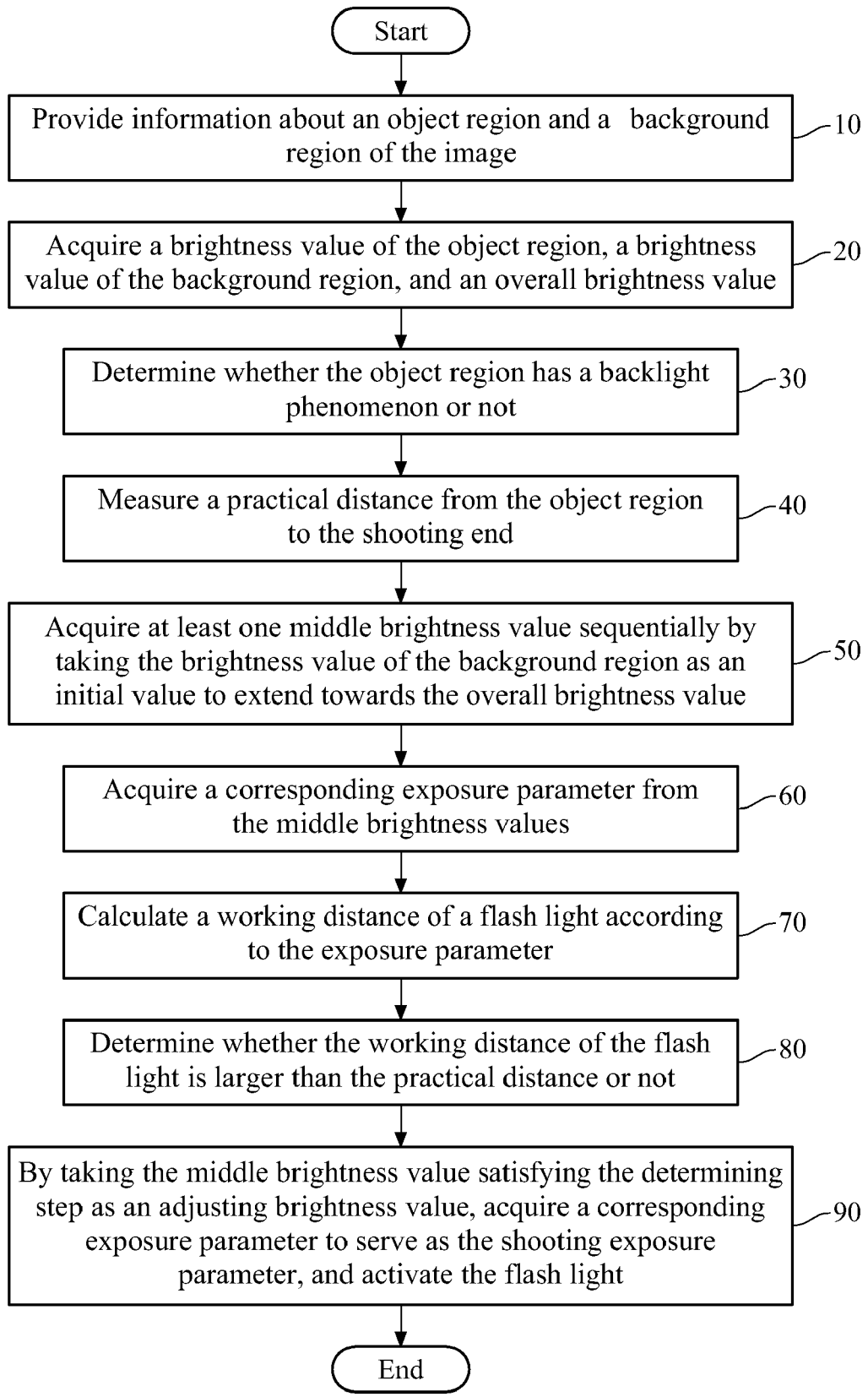
FIG. 1 is a flow chart of an automatic exposure control method according to an embodiment of the present invention.

Referring to FIG. 1, it is a flow chart of an automatic exposure control method according to an embodiment of the present invention. As shown in FIG. 1, the automatic exposure control method is used to control a shooting exposure parameter for shooting an image by a shooting end, in which the image is formed by an object region and a background region. Here, the object region and the background region refer to regions respectively used for displaying the object and the background in a planar image.

Firstly, information about the object region and the background region of the image is provided (Step 10), and then, a brightness value of the object region, a brightness value of the background region, and an overall brightness value obtained by combining the brightness value of the object region with that of the background region are acquired (Step 20).

Next, it is determined whether the object region has a backlight phenomenon or not according to the brightness value of the object region and that of the background region (Step 30).

Once it is determined that the object region has the backlight phenomenon, a practical distance from the object region to the shooting end is measured (Step 40). Here, the practical distance is a distance between the shooting end and an object entity of the object region, which may be obtained by a focusing frame.

Then, at least one middle brightness value is acquired sequentially by taking the brightness value of the background region as an initial value to extend towards the overall brightness value (Step 50). The middle brightness values between the brightness value of the background region and the overall brightness value are acquired to find out the proper brightness value between the brightness value of the background region and the overall brightness value, so as to obtain the image shot at a proper exposure parameter.

Then, a corresponding exposure parameter is acquired from the middle brightness values (Step 60). Then, a working distance of a flash light is calculated according to the exposure parameter (Step 70), and then it is determined whether the working distance of the flash light is larger than the practical distance or not (Step 80).

Finally, the middle brightness value satisfying the step of determining whether the working distance of the flash light is larger than the practical distance or not (Step 80) is taken as an adjusting brightness value, and according to the adjusting brightness value, a corresponding exposure parameter is acquired to serve as the shooting exposure parameter, and the flash light is activated (Step 90).

The working distance of the flash light is calculated from the following formula:

$$FWD = GN/FN \times \sqrt{(ISOspeed/100)},$$

in which FWD represents the working distance of the flash light, GN represents a flash light coefficient, FN represents the aperture value, and ISOspeed represents the exposure speed level.

It can be known from the above formula that different exposure parameters are corresponding to different working distances of the flash light.

Referring to FIGS. 2A, and 2B, an embodiment of obtaining the brightness information in the present invention is illustrated. As shown in FIG. 2A, a drawing of the overall grey value distribution of the image is obtained from a known background region and information about an object region. The n-shaped part of a grey value 100 in the drawing represents the grey value of the background region, and the other parts of the grey value 10 represent the grey value of the object region. The grey value is calculated through a formula including the information about three primary colors, and the smaller the grey value is, the darker the region is.

Referring to FIG. 2B, it is a weight distribution view of the object region and the background region under the backlight effect. In the drawing, the weight of the object region is set as 20, and the background region is set as 10. However, practically, different weights may be arranged depending upon different situations.

According to the weight distribution of FIG. 2B, the weighted average is performed on the background region of FIG. 2A, to obtain a background weighted average grey value BG, and a brightness value $BV_1$ of the background region may be obtain from a formula:

$$Log_2(BG).$$

According to the weight distribution of FIG. 2B, the weighted average is performed on the whole region of FIG. 2A, to obtain a whole weighted average grey value (WG) of the whole image, and an overall brightness value $BV_2$ may be obtain from a formula:

$$Log_2(WG).$$

Similarly, the weighted average grey value and the brightness value of the object region may also be obtained through the above method.

The backlight phenomenon is determined according to whether the brightness value $BV_1$ of the background region—the brightness value of the object region is larger than a threshold.

Figure 3:
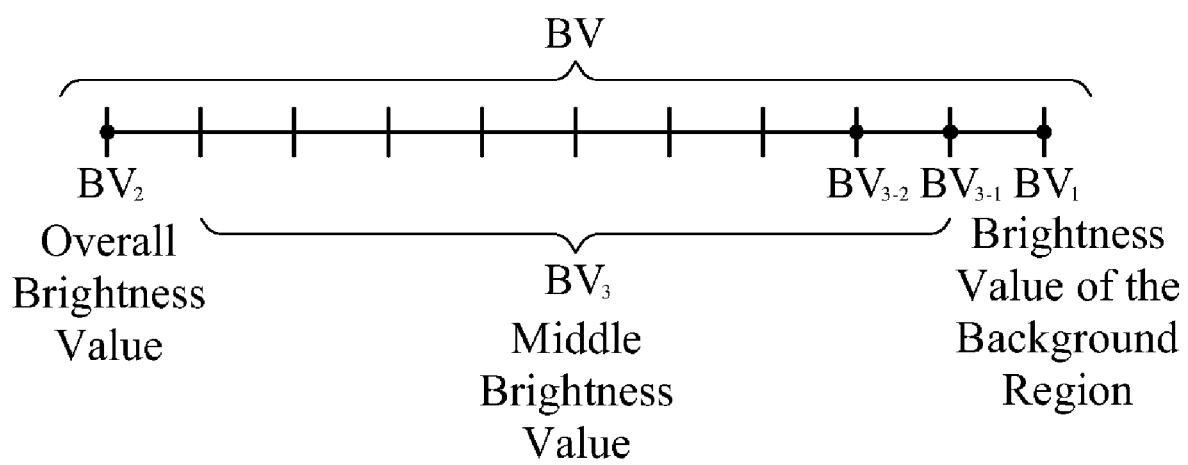
FIG. 3 is a schematic view of brightness value relation according to an embodiment of the present invention.

Referring to FIG. 3, it is a schematic view of brightness value relation according to an embodiment of the present invention. As shown in FIG. 3, a plurality of brightness values BV is shown, in which a plurality of middle brightness values $BV_3$ exists between the brightness value $BV_1$ of the background region and the overall brightness value $BV_2$. A specific number of the middle brightness values $BV_3$ are obtained by changing equidistantly or changing at a specific distance between the brightness value $BV_1$ of the background region and the overall brightness value $BV_2$. Alternatively, a fixed number of middle brightness values $BV_3$ are acquired between the brightness value $BV_1$ of the background region and the overall brightness value $BV_2$, that is, the length between the brightness value $BV_1$ of the background region and the overall brightness value $BV_2$ is equidistantly divided into M parts, in which M is a positive integer larger than or equal to 2. For the convenience of illustration, FIG. 3 only shows that the length between the brightness value $BV_1$ of the background region and the overall brightness value $BV_2$ is equidistantly divided into 10 parts.

Then, beginning from the brightness value $BV_1$ of the background region for a second brightness information 300 to extend towards the overall brightness value $BV_2$ for the third brightness information 400, it is sequentially determined an adjusting brightness value satisfying the condition that the working distance of the flash light is larger than or equal to the practical distance.

When the relation between the working distances of the flash light and the practical distance is determined sequentially from the brightness value $BV_1$ of the background region to extend towards the overall brightness value $BV_2$, in which the working distances of the flash light are corresponding to the brightness value $BV_1$ of the background region, the middle brightness values $BV_3$, and the overall brightness value $BV_2$. Particularly, one of the brightness value $BV_1$ of the background region, the middle brightness values $BV_3$, and the overall brightness value $BV_2$ is taken as a comparison brightness value, that is, the brightness value $BV_1$ of the background region, the middle brightness values $BV_3$, and the overall brightness value $BV_2$ are sequentially taken as a comparison brightness value for determination.

Next, an exposure parameter is acquired from the comparison brightness value, and then, according to the exposure parameter corresponding to the comparison brightness value, the corresponding working distance of the flash light is calculated.

Then, the working distance of the flash light obtained by calculation is compared with the practical distance, and if the working distance of the flash light is larger than or equal to the practical distance, the corresponding comparison brightness value serves as the adjusting brightness value.

Then, the working distances of the flash light for the exposure parameters corresponding to the comparison brightness values are acquired sequentially from the brightness value $BV_1$ of the background region to extend towards the overall brightness value $BV_2$ according to the above formula, and then the working distance is made to be compared with the practical distance. For example, firstly, the working distance of the flash light for the exposure parameter corresponding to the brightness value of the brightness value $BV_1$ is acquired and then compared with the practical distance. If it does not satisfy the condition that the corresponding working distance of the flash light is larger than or equal to the practical distance, the process continues to acquire a first middle brightness value $BV_{3-1}$. If the first middle brightness value $BV_{3-1}$ does not satisfy the condition that the corresponding working distance of the flash light is larger than or equal to the practical distance, the process continues to acquire a second middle brightness value $BV_{3-2}$, and continues to determine the relation between the corresponding working distance of the flash light and the practical distance, until the brightness value satisfying the condition that the working distance of the flash light is larger than or equal to the practical distance is obtained or until the overall brightness value $BV_2$ is determined. In other words, if the condition that the corresponding working distance of the flash light is larger than or equal to the practical distance is satisfied, the corresponding comparison brightness value serves as the adjusting brightness value, and the subsequent determination of the brightness value is stopped. When the brightness value $BV_1$ of the background region does not satisfy all the middle brightness values $BV_3$, that is, the exposure parameter of the adjusting brightness value cannot be obtained, the exposure parameter of the overall brightness value is taken as the shooting exposure parameter, and the overall brightness value $BV_2$ serves as the adjusting brightness value.

When the adjusting brightness value is the brightness value of the background region or the middle brightness value, the flash light is activated. When the adjusting brightness value is the overall brightness value, that is, the exposure parameter of the overall brightness value is taken as the shooting exposure parameter, the flash light is not activated.

Finally, according to the adjusting brightness value, the shooting exposure parameters including an exposure speed level, an aperture value, and an exposure time are acquired.

In other words, when the comparison brightness value is the brightness value of the background region or the middle brightness values, and the working distance of the flash light for the corresponding exposure parameter is larger than or equal to the practical distance, the object entity of the object region can be compensated by the flash light. Therefore, the comparison brightness value is taken as the adjusting brightness value, the corresponding exposure parameter serves as the shooting exposure parameter, and the flash light is activated. Furthermore, according to the obtained shooting exposure parameter, the image is captured through flashing the flash light. In addition, when the comparison brightness value is the overall brightness value and the working distance of the corresponding exposure parameter thereof is larger than or equal to the practical distance, the comparison brightness value is taken as the adjusting brightness value, and the corresponding exposure parameter serves as the shooting exposure parameter. Since the object entity of the object region may be compensated by the flash light, the object region has sufficient brightness, so the flash light is not activated.

That is, under the situation that the flash light is effectively operated, a low exposure parameter is selected for operating together with the flash light to capture images, such that the background region and the object region of the acquired image may have proper brightness.

To sum up, through the technical means of the present invention, the proper overall brightness may be obtained by effectively adjusting the brightness value, and the compensation of the flash light may be controlled by determining the working distance of the flash light for the corresponding exposure parameter of each brightness value, such that the brightness of the background and the object may be preferably adjusted and compensated, thereby improving the quality of the shot image and thoroughly solving the problems of the prior art.

What is claimed is:

1. An automatic exposure control method, suitable for controlling a shooting exposure parameter for shooting an image by a shooting end, comprising:
   providing information about an object region and a background region of the image;
   acquiring a brightness value of the object region, a brightness value of the background region, and an overall brightness value obtained by combining the brightness value of the object region with that of the background region;
   determining whether the object region has a backlight phenomenon or not according to the brightness value of the object region and that of the background region;
   measuring a practical distance from the object region to the shooting end;
   sequentially acquiring at least one middle brightness value by taking the brightness value of the background region as an initial value to extend towards the overall brightness value;
   acquiring a corresponding exposure parameter from the acquired middle brightness values;
   calculating a working distance of a flash light according to the exposure parameter;
   determining whether the working distance of the flash light is larger than the practical distance or not; and
   by taking the middle brightness value satisfying the determining step as an adjusting brightness value, acquiring a corresponding exposure parameter according to the adjusting brightness value to serve as the shooting exposure parameter, and activating the flash light.

2. The automatic exposure control method as claimed in claim 1, wherein when it is impossible to acquire the middle brightness value satisfying the determining step to serve as an adjusting brightness value, an exposure parameter of the overall brightness value is taken as the shooting exposure parameter.

3. The automatic exposure control method as claimed in claim 2, wherein when the exposure parameter of the overall brightness value is taken as the shooting exposure parameter, the flash light is not activated.

4. The automatic exposure control method as claimed in claim 1, wherein the process of acquiring the overall brightness value of the image comprises: acquiring a grey scale distribution of the whole image; obtaining a weighted average grey value of the whole image by performing a weighted average on the grey scale distribution of the whole image; and obtaining the overall brightness value by a formula of $\log_2$ (weighted average grey value of the whole image).

5. The automatic exposure control method as claimed in claim 4, wherein a weight for the brightness value of the object region is larger than that for the brightness value of the background region.

6. The automatic exposure control method as claimed in claim 1, wherein the step of determining the backlight phenomenon comprises: respectively acquiring the grey scale distribution of the information about the image object region and that of the background region; respectively performing the weighted average on the object region and the background region to obtain a weighted average grey value of the object region and a weighted average grey value of the background region; and determining the backlight phenomenon according to whether a value of $\log_2$(weighted average grey value of the background region)–$\log_2$(weighted average grey value of the object region) is larger than a threshold or not.

7. The automatic exposure control method as claimed in claim 1, wherein the exposure parameters comprise an exposure speed level, an aperture value, and an exposure time.

8. The automatic exposure control method as claimed in claim 7, wherein the working distance of the flash light is obtained according to the aperture value corresponding to the middle brightness value and a flash light coefficient (G number) corresponding to the flash light.

9. The automatic exposure control method as claimed in claim 1, wherein the step of acquiring the middle brightness values comprises: acquiring the middle brightness values equidistantly between the brightness value of the background region and the overall brightness value.

10. The automatic exposure control method as claimed in claim 1, wherein the step of acquiring the middle brightness values comprises: acquiring a fixed number of middle brightness values between the brightness value of the background region and the overall brightness value.

* * * * *